United States Patent

Erlichman

[15] 3,687,032

[45] Aug. 29, 1972

[54] PHOTOGRAPHIC APPARATUS

[72] Inventor: Irving Erlichman, Wayland, Mass.

[73] Assignee: Polaroid Corporation, Cambridge, Mass.

[22] Filed: May 1, 1970

[21] Appl. No.: 33,635

[52] U.S. Cl. ....................95/13, 95/11 R

[51] Int. Cl. ....................G03b 17/52

[58] Field of Search ....................95/11, 13, 14, 30

[56] References Cited

UNITED STATES PATENTS

| | | | |
|---|---|---|---|
| 458,907 | 9/1891 | Kipper et al. | 95/30 |
| 458,981 | 9/1891 | Perry | 95/30 |
| 2,435,717 | 2/1948 | Land | 95/13 |
| 3,181,444 | 5/1965 | Takats et al. | 95/14 X |
| 3,097,584 | 7/1963 | Wright | 95/14 X |
| 3,270,642 | 9/1966 | Nerwin | 95/13 |
| 2,496,630 | 2/1950 | Land | 95/13 |
| 3,426,664 | 2/1969 | Norton | 95/13 |

*Primary Examiner*—John M. Horan
*Assistant Examiner*—Alan A. Mathews
*Attorney*—Brown and Mikulka and Alfred E. Corrigan

[57] ABSTRACT

Photographic apparatus including a support member for supporting photosensitive elements in position for exposure. A transport system including a reciprocally mounted drawer is provided for moving exposed photosensitive elements from the exposure position to a viewing position wherein, after processing thereof, the exposed photosensitive element may be viewed in place or removed from the apparatus. If the exposed photosensitive element is allowed to remain in the viewing position, or if it is returned to the viewing position, the transport system will allow the exposed photosensitive element to be moved to a storage chamber within the apparatus as the transport system moves another exposed photosensitive element between the exposure position and the viewing position.

9 Claims, 11 Drawing Figures

INVENTOR.
IRVING ERLICHMAN

BY Brown and Mikulka
and
Alfred E. Corrigan
ATTORNEYS

Patented Aug. 29, 1972

3,687,032

5 Sheets-Sheet 2

INVENTOR.
IRVING ERLICHMAN

BY Brown and Mikulka
and
Alfred E. Corrigan
ATTORNEYS

Patented Aug. 29, 1972

3,687,032

5 Sheets-Sheet 3

INVENTOR.

IRVING ERLICHMAN

BY Brown and Mikulka and Alfred E. Corrigan

ATTORNEYS

INVENTOR.
IRVING ERLICHMAN
BY Brown and Mikulka
and
Alfred E. Corrigan
ATTORNEYS Patented Aug. 29, 1972 3,687,032

5 Sheets-Sheet 5

INVENTOR.
IRVING ERLICHMAN

BY Brown and Mikulka
and
Alfred E. Corrigan
ATTORNEYS

PHOTOGRAPHIC APPARATUS

BACKGROUND OF THE INVENTION

1. Field of the Invention

This invention relates to photographic apparatus, e.g., cameras, of the type adapted to expose, process and store individual photosensitive elements and, more particularly to a camera of the self-developing type having an arrangement of parts which cooperate to move an exposed photosensitive element from an exposure position to a viewing position wherein, after processing thereof, it may be viewed in place or removed and returned to its viewing position prior to being automatically moved to a storage chamber within the apparatus.

2. Description of the Prior Art

The operation of self-developing cameras is well known and generally includes the steps of exposing a film unit of the type disclosed in U.S. Pat. No. 3,415,644 granted to Edwin H. Land on Dec. 10, 1968; contacting the exposed film unit with a processing agent to initiate a diffusion transfer process; removing the film unit from the camera after the film unit has been processed; and, after viewing the film unit, returning the film unit to a storage chamber located within, or attached to, the camera. U.S. Pat. No. 2,467,320 shows one arrangement for storing film units after exposure. In this patent, i.e., U.S. Pat. No. 2,467,320, the film unit is moved, subsequent to exposure, between a pair of pressure-applying rolls which spread a processing agent across the film unit to initiate a diffusion transfer process. After passing between the pressure-applying rolls the film unit is directed to a storage chamber from which it may be removed, viewed and replaced in the storage chamber. U.S. Pat. No. 3,426,664 shows still another arrangement for storing film units after exposure. In this arrangement the exposed film unit is moved around the periphery of a drum before being advanced to a storage chamber. When it is desired to view the exposed film unit, the operator opens a door in the camera, removes the film unit and turns it over to view the image. After viewing the image the operator 180 may then reinsert the film unit into the storage chamber. In both of these patents the operator has to perform a common act, i.e., remove the film unit from the camera before it can be viewed. Needless to say, problems may arise if an operator is required to perform an act even as simple as this, e.g., the operator may drop the film unit thereby possibly losing or damaging it or he may bend or otherwise mutilate the film unit upon reinserting the film unit into the camera. From the foregoing it can be seen that the prior art fails to provide a solution for this problem if indeed it even recognizes the problem.

SUMMARY OF THE INVENTION

The invention relates to a camera of the self-developing type wherein a plurality of photosensitive elements are adapted to be sequentially exposed, processed and moved to a viewing station wherein the photosensitive elements may be individually viewed in place prior to being automatically moved to a storage chamber within the camera.

The camera is provided with means for transporting an exposed photosensitive element from an exposure position to a viewing position prior to being advanced to a storage chamber. The transporting means include film advancing apparatus, a pair of rolls and a drawer mounted for reciprocating movement for moving an exposed photosensitive element between the exposure and viewing positions. The drawer includes a resilient spring clip which is adapted to move the trailing end of an exposed photosensitive element to a position below a pair of pressure-applying members whereby the photosensitive element will be properly orientated for viewing when it is moved into the viewing position. The resilient spring clip also retains the exposed photosensitive element in place in the viewing position thereby allowing the user of the camera to view the exposed element without the need for holding it. The transporting means include structure for moving a subsequentially exposed photosensitive element from the exposure position to the viewing position as the previously exposed photosensitive element is being advanced to a storage chamber.

An object of the invention is to provide, in photographic apparatus of the type wherein a plurality of photosensitive elements are adapted to be sequentially exposed, means for transporting an exposed photosensitive element from an exposure position to a viewing position wherein it may be viewed in place.

Another object of the invention is to provide in photographic apparatus of the type described, means for orienting an exposed photosensitive element such that the exposed photosensitive element may be viewed in place.

Another object of the invention is to provide, in photographic apparatus of the type described, including a storage chamber for receiving exposed photosensitive elements, means providing ingress to the apparatus to allow removal of an exposed photosensitive element from either the viewing position or the storage chamber.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
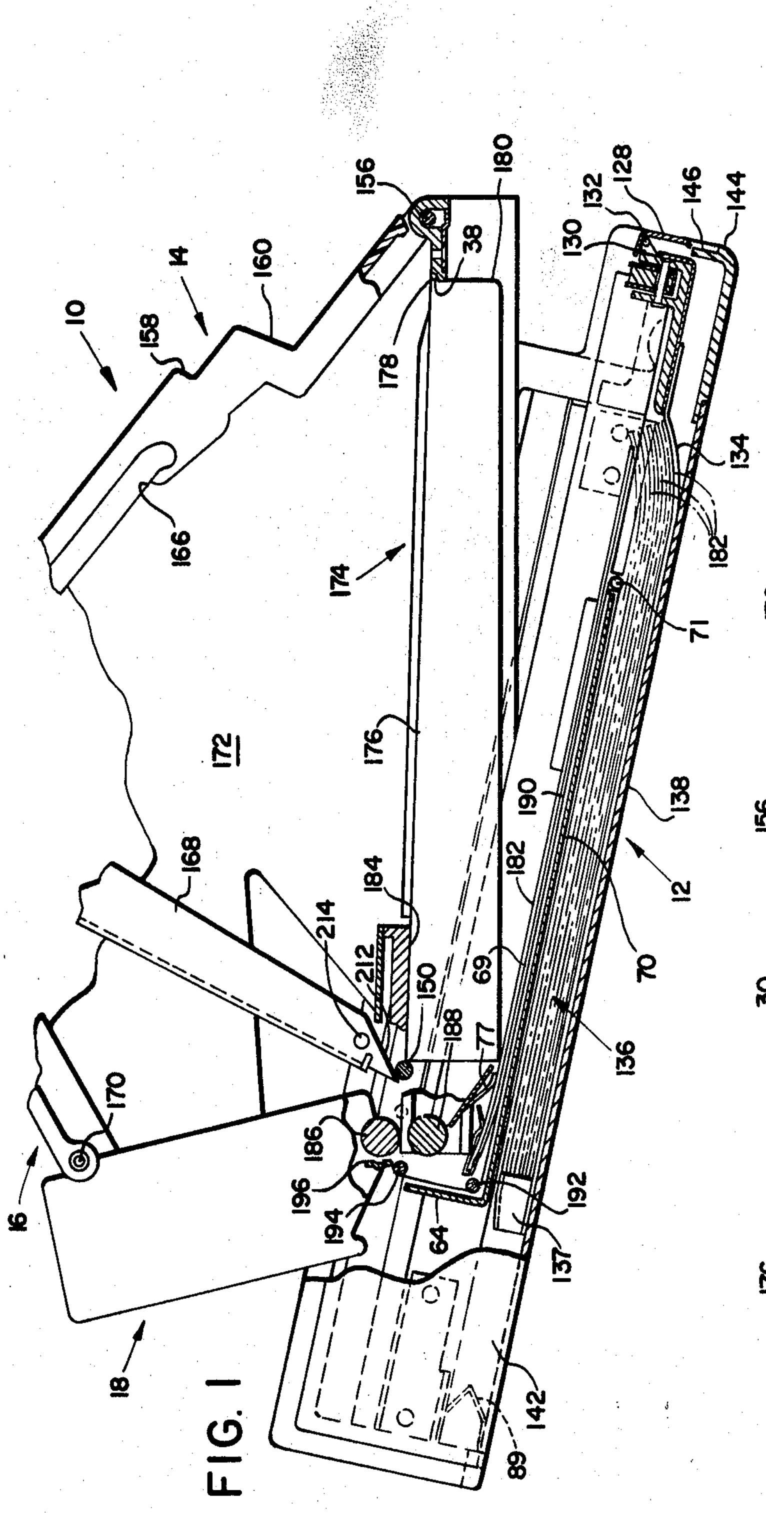
FIG. 1 is an elevation view, partly in section, of an extensible type camera shown in its extended, operative position with its film loading door in the open or loading position and a processed photosensitive element shown in a viewing position.
Figure 8:
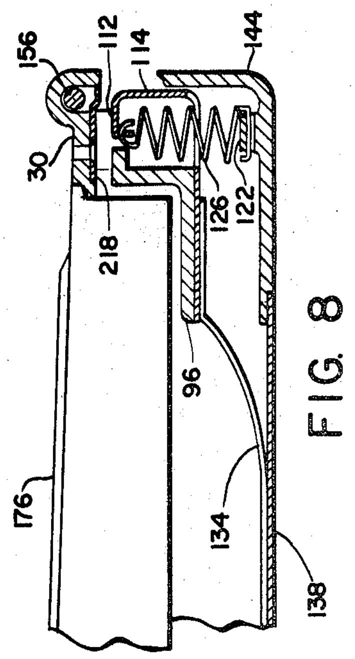
FIGS. 7 and 8 are elevation views, partly in section, of one end of the camera showing a resilient connection between one of the sections of the camera and its film loading door.
Figure 7:
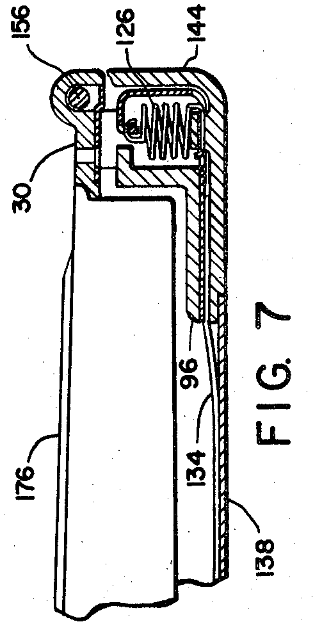
Figures 3, 4:
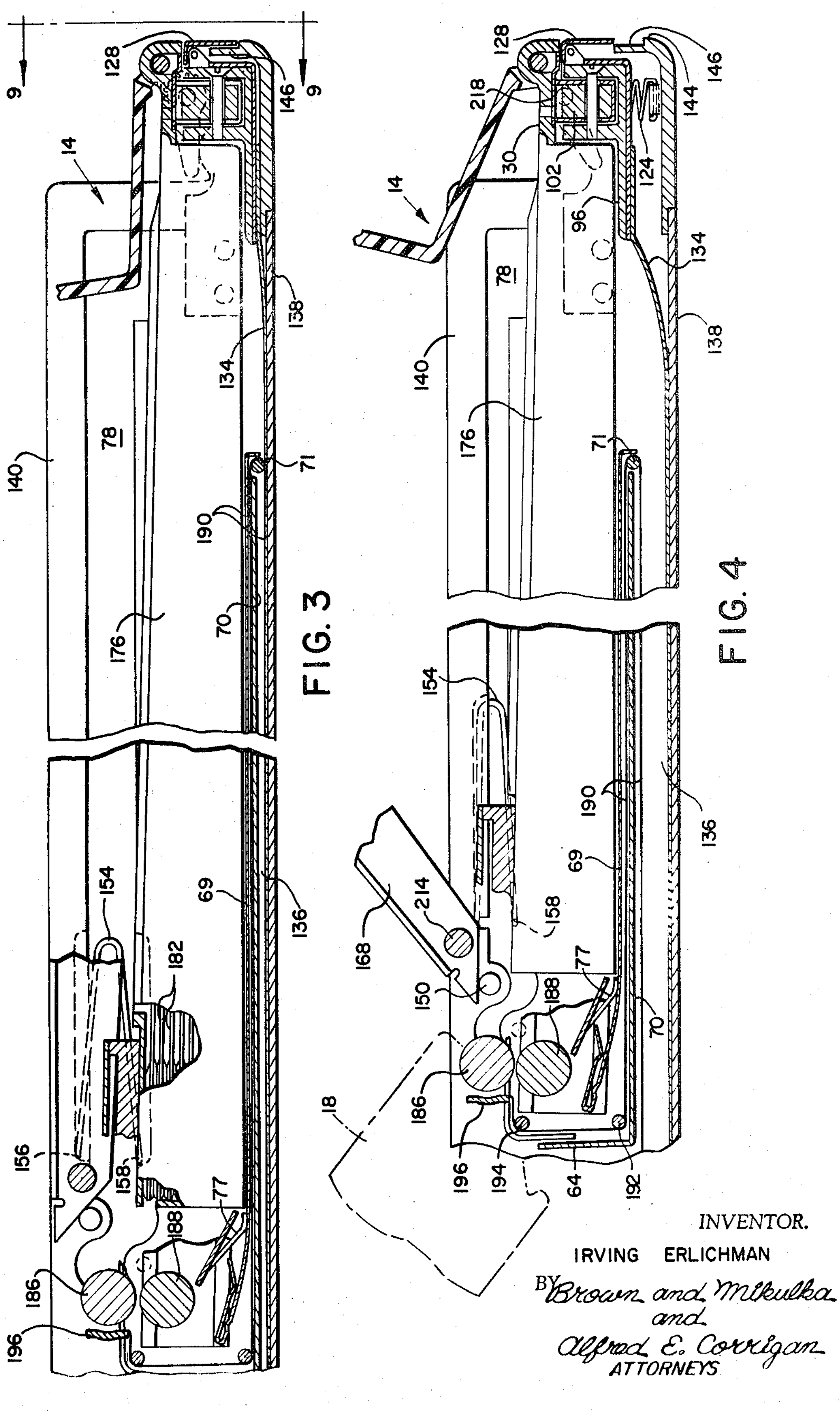
FIG. 3 is an elevation view, partly in section, of a portion of the camera shown in the compact, inoperative position.
FIG. 4 is a view similar to FIG. 3 showing sections of the camera in a position intermediate the compact, inoperative position and the extended, operative position.

Reference is now made to FIG. 1 of the drawings wherein is illustrated a camera 10 of the extensible type. Camera 10 includes a plurality of sections 12, 14, 16 and 18 pivotally coupled to each other for movement between the extended, operative position (except for the film loading door being open) shown in FIGS. 1 and 6, and the compact, inoperative position shown in FIGS. 3 and 5.

Figure 2:
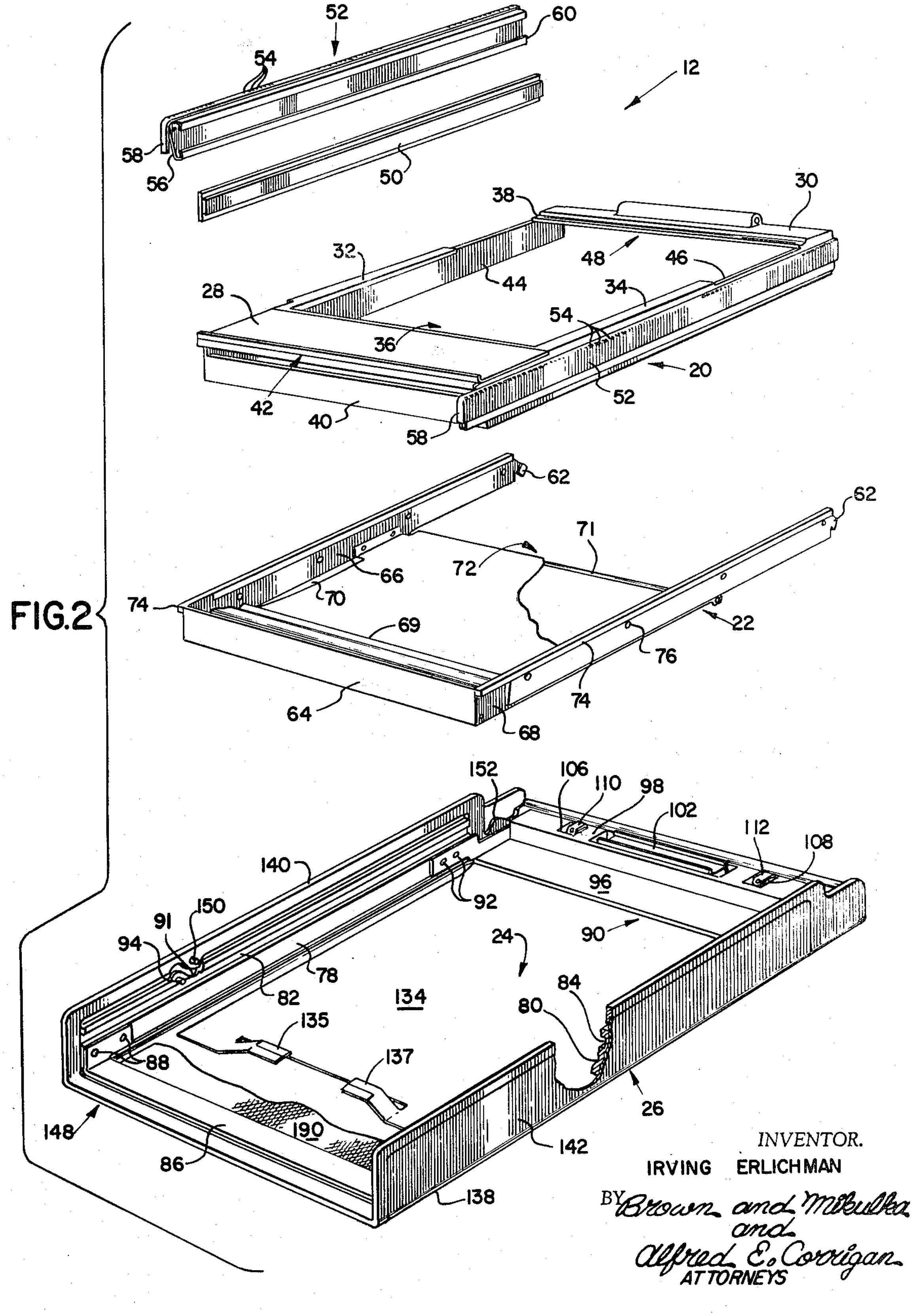
FIG. 2 is an exploded perspective view, partly in section, of one of the sections of the camera shown in FIG. 1.

Referring to FIG. 2 it can be seen that section 12 is comprised of a plurality of members including an inner frame member 20 for supporting a container of film units in position for exposure, the contacting surfaces of the film container and inner frame member forming a lighttight seal; a drawer 22 adapted to receive a film unit, subsequent to exposure thereof, and transfer the film unit to a storage chamber within the camera; and an outer frame member 24 which cooperates with drawer 22 to guide it in a reciprocating manner, and further cooperates with a bottom cover member or closure member 26 to define a film storage chamber as will be more fully explained hereinafter. Because of space limitations in the drawing of FIG. 2, outer frame member 24 and closure member 26 are not shown in an exploded relation but rather in the positions they occupy relative to each other when the camera is in the compact, inoperative position.

Inner support member 20 includes a forward wall comprised of sections 28, 30, 32 and 34 which cooperate to define an exposure opening 36. Wall portion 28 encloses means (not shown) for entering an aperture in a film container and moving a film unit therefrom, subsequent to exposure, in a manner similar to that disclosed in my copending application Ser. No. 179, filed Jan. 2, 1970, entitled Photographic Apparatus, and assigned to the same assignee as the instant application. Wall portion 30 includes a recess 38 for receiving a lip on the film container for supporting the latter, while wall portions 32 and 34 restrict the upward movement of the film container relative to the inner frame member and assist in locating the forwardmost film unit in position for exposure. The inner frame member 20 further includes a leading end wall 40 having an elongated opening 42 therein dimensioned to allow passage of a film unit therethrough and side walls 44 and 46. The trailing end of inner frame member 20 is provided with an opening 48 which facilitates the insertion of a film container into position within inner frame member 20. Fixedly mounted on each side wall 44 and 46 is an elongated rack support member 50 having a T-shaped configuration in cross section for receiving and slidably supporting a generally U-shaped rack 52. Each rack 52 includes a plurality of apertures 54 therein for receiving the teeth of a sprocket for moving the racks in a reciprocating manner. One end 56 of the rack is provided with a downwardly turned member 58 which is adapted to engage the rearwardly facing surface (to the right as viewed in FIG. 2) of the leading end wall of the drawer 22 for moving the drawer 22 outwardly, i.e., to the left as seen in FIG. 1, and an end 60 which is adapted to engage means 62 on the drawer 22 for moving the latter to the right as seen in FIG. 1.

Drawer 22 includes a leading end wall 64, side walls 66 and 68 and a rear wall 70. Rear wall 70 is terminated at its trailing end by a roller 71 rotatably mounted intermediate the ends of walls 66 and 68 in order to facilitate movement of a curtain thereover as will be explained shortly and a resilient spring clip 69 which is adapted to grip the leading end of a film unit after it has passed from between a pair of pressure-applying members. An elongated bearing member 74 is mounted on each side wall 66 and 68 by suitable means such as rivets 76.

Figure 9:
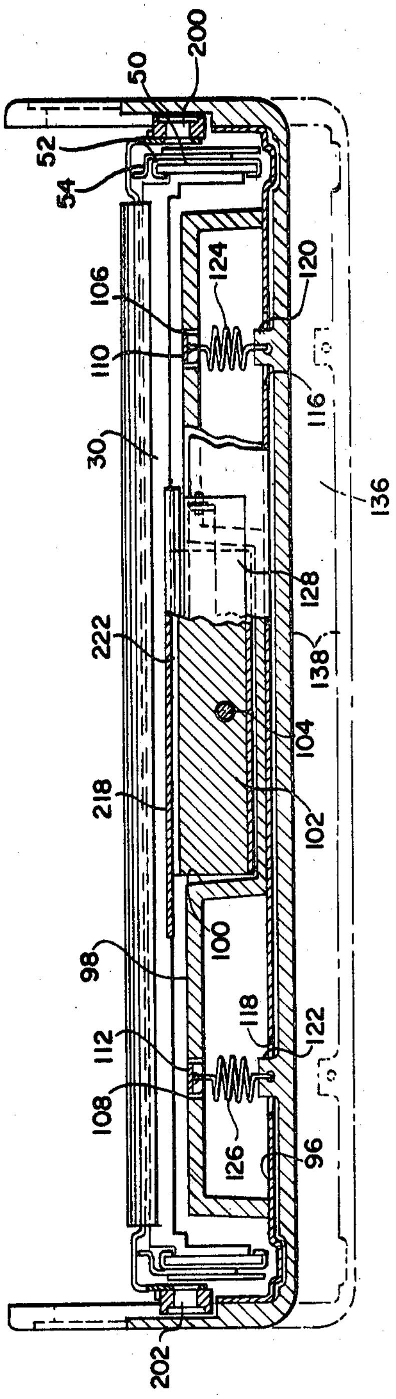
FIG. 9 is a view, partly in section, looking in the direction of arrows 9—9 in FIG. 3.
Figure 11:
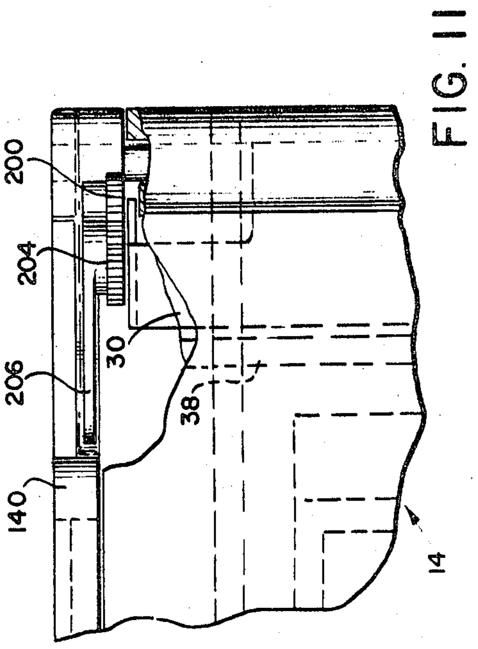
FIG. 11 is a fragmentary elevation view, partly in section, of one corner of the camera.
Figure 10:
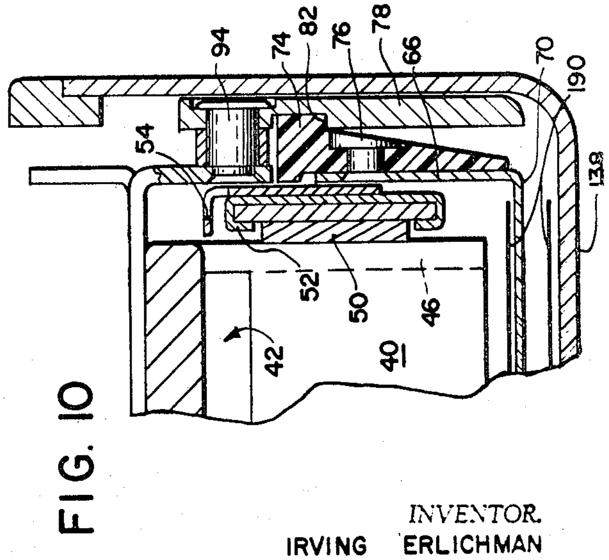
FIG. 10 is an elevation view, partly in section of a pivotal connection between the camera'S film loading door and a film support member.

Outer frame member 24 includes a pair of side walls 78 and 80 having recessed guides 82 and 84 therein for receiving the bearing members 74. The leading ends of side walls 78 and 80 are attached to a member 86 by rivets 88. The trailing ends of side walls 78 and 80 are connected to a support member 90 by rivets 92. Each of the side walls 78 and 80 further includes a recess 91 for receiving a cam follower as will be explained hereinafter and a pivot pin 94 which enables closure member 26, outer frame member 24 and drawer 22 to pivot as a unit to the open position shown in FIG. 1. Support member 90 includes a first portion 96 adapted to receive one end of inner frame member 20 and a second raised portion 98 which is adapted to support a closure means in the form of a magnet 102. Second portion 98 includes an elongated recessed section 100 in which magnet 102 is mounted by suitable means such as a screw 104 (see FIG. 5). Second portion 98 further includes apertures 106 and 108 which are adapted to receive lugs 110 and 112 extending from the trailing end wall 114 of outer frame member 24. A second pair of apertures 116 and 118 (see FIG. 9) are located in support member 90 in alignment with apertures 106 and 108. In the compact, inoperative position of the camera, a second pair of lugs 120 and 122, integral with closure member 26, extend through apertures 116 and 118, respectively. Lugs 110, 112, 120 and 122 are adapted to mount a pair of tension springs 124 and 126 for resiliently urging closure member 26 toward outer frame member 24. A lever 128 is pivotally mounted to second portion 98 by flanges 130 and pins 132 (only one of each being shown). Lever 128 is adapted to be actuated in a clockwise manner by the user of the camera to break the magnet coupling between the magnet 102 and the inner frame member 20 as will be more clearly explained hereinafter. A resilient plate 134 is connected at its trailing end to the underside of first portion 96 and includes a pair of upwardly projecting resilient stop members 135 and 137. As can be seen in FIGS. 1 and 2, the bias of plate 134 is such that the greater portion of the plate remains in contact with closure member 26 in all positions of the camera. Plate 134, in cooperation with closure member 26, outer frame member 24 and drawer 22, defines a storage chamber 136 having a variable volume for storing film units subsequent to exposure and is the subject matter of an invention disclosed and claimed in application Ser. No. 36,251, filed by Edwin H. Land and Irving Erlichman on May 11, 1970, said application being assigned to the assignee of the instant application.

Closure member 26 includes a generally rectangularly shaped rear wall 138, a pair of upstanding side walls 140 and 142, a trailing end wall 144 having a section 146 of reduced thickness and an open leading end 148. As can be seen in FIG. 2, outer frame member 24 is adapted to be positioned within closure member 26. Cam followers 150 (only one of which is shown), having a common axis, are mounted on each side wall 140 and 142 and are adapted to be moved into recesses 91 in side walls 78 and 80. A second set of cam followers 152 (only one of which is shown) extends from side walls 140 and 142. Spring means 154 (see FIGS. 3 and 4) has one of its ends 156 suitably attached to side wall 140 of closure member 26 and its other end 158 connected to inner frame member 20 for resiliently urging closure member 26 toward outer frame member 24.

Figure 5:
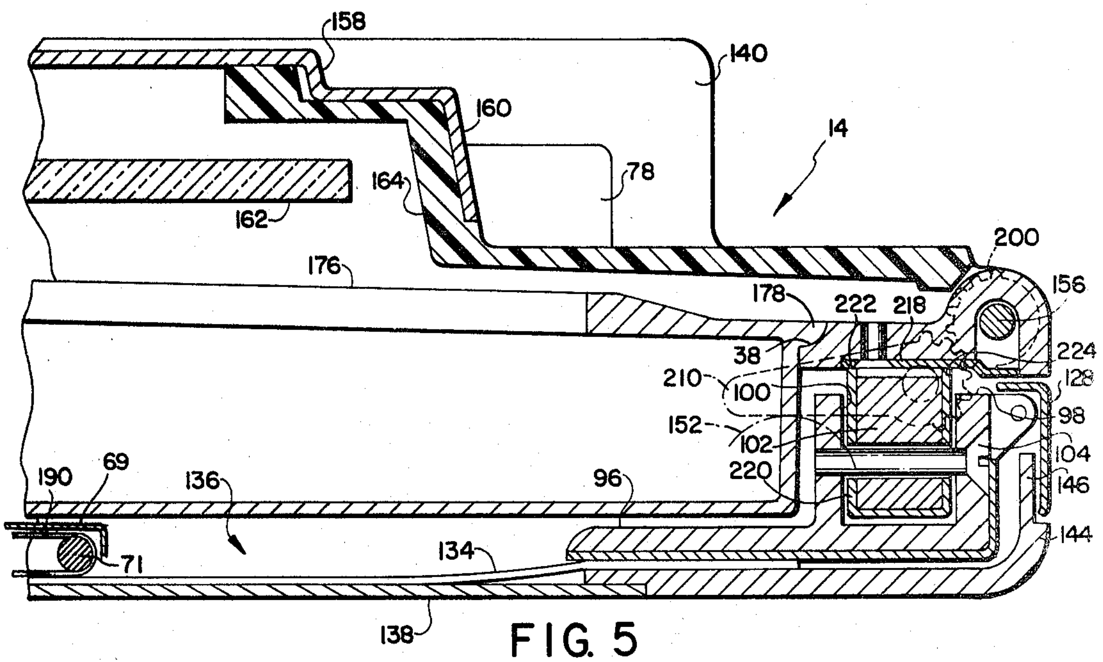
FIG. 5 is an enlarged elevation view, partly in section, of one end of the camera, the camera being shown in the compact, inoperative position.
Figure 6:
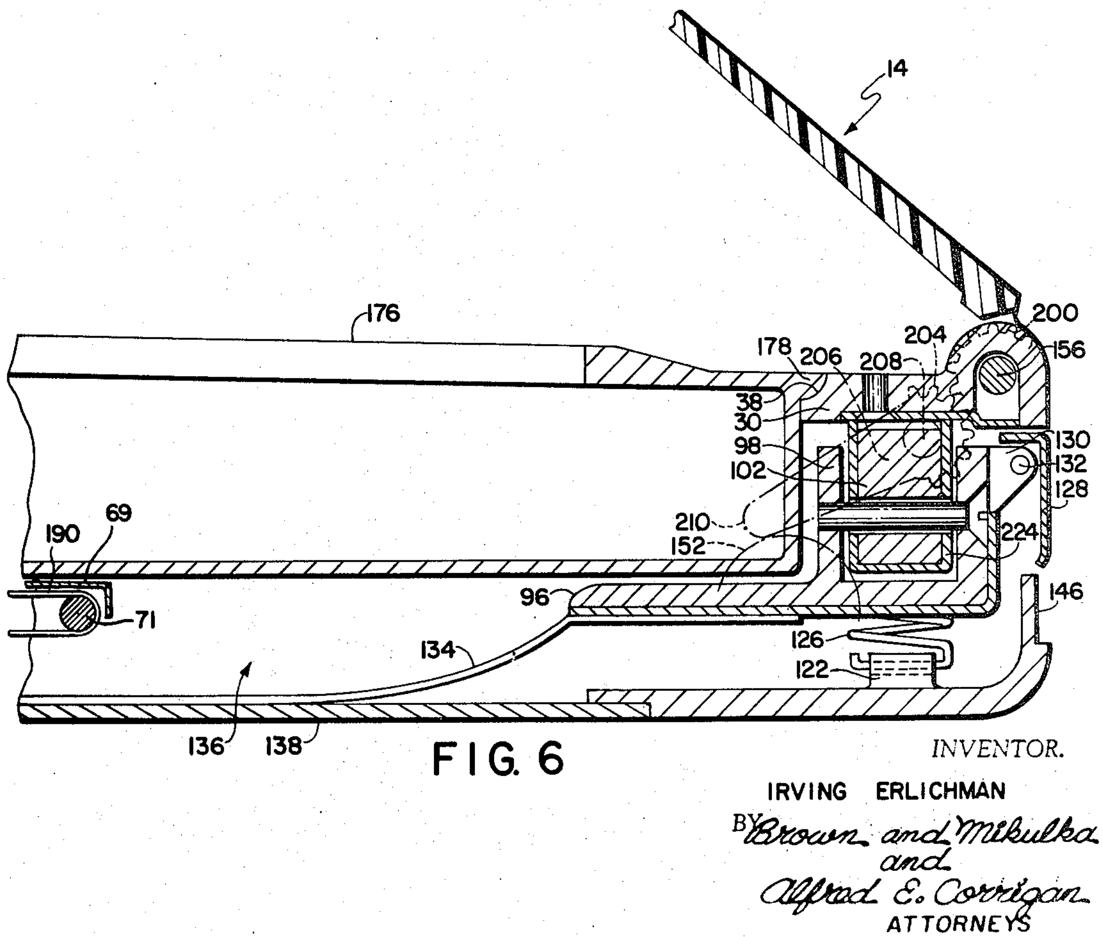
FIG. 6 is a view similar to FIG. 5 showing sections of the camera in the extended, operative position.

Section 14 is pivotally coupled to inner frame member 20 about pivot pin 156 for movement between the compact, inoperative position shown in FIG. 5 and the extended, operative position shown in FIG. 6. Section 14 further includes a pair of recesses 158 and 160 for receiving a rangefinder-viewfinder (not shown) when in the compact position. A component of the camera's exposure system, i.e., a reflecting surface or mirror 162, is mounted on the interior surface 164 of section 14 by any suitable means. Each side of section 14 has a slot 166 therein which is adapted to receive a pin mounted on an erecting link 168 for guiding the sections 12, 14, 16 and 18 between the compact and extended positions.

Section 18 is pivotally coupled to the inner frame member 20 at one end and has its other end pivotally coupled to section 16 about hinge 170. Section 16 is in turn pivotally coupled to section 14 to complete the interconnection between the sections 12, 14, 16 and 18. Section 18 houses the camera's lens and shutter assembly as well as various other parts of the camera including a motor for operating various components of the camera. A flexible bellows 172 is attached to sections 12, 14 and 18 to provide a lighttight path between the camera's lens and shutter assembly and the photosensitive element located in position for exposure within film container 38. For a more detailed description of sections 14, 16 and 18 reference is made to the copending application of Lawrence M. Douglas entitled Camera Latch, Ser. No. 885,420, filed Dec. 16, 1969, and assigned to the same assignee as the instant application.

Positioned within and supported by inner frame member 20 is a film assemblage 174 of the type shown in my copending application entitled Film Container, Ser. No. 13623 filed February 24, 1970 and assigned to the same assignee as the instant application. Film assemblage 174 includes a container 176 having a lip 178 located near its trailing end 180 which is adapted to be received by recess 38 in inner support member 20 for supporting the trailing end of the film container in position for exposure of the forwardmost film unit located within the container. Any suitable means may be provided for supporting the remainder of the film container in the position shown in solid lines in FIG. 1, e.g., rails and grooves as taught in my copending application Ser. No. 13,623.

Positioned within the container 176 are a plurality of film units 182 of the type shown and described in the aforementioned U.S. Pat. No. 3,415,644. Film units 182 are adapted to be processed by moving the film units subsequent to exposure, from a first position, i.e., their exposure position which lies generally in a plane containing an interior surface 184 of inner support member 20, into the bite of a pair of pressure-applying members, e.g., rolls 186 and 188, which are adapted to spread a processing agent between elements of the film unit to initiate a diffusion transfer process which ultimately results in a viewable image, as described in said patent. After the film unit has passed from between the rolls 186 and 188 it is moved to a second position within the camera wherein it is available for viewing by the user prior to being moved into storage chamber 136.

A curtain 190 made from any suitable opaque material is mounted between rolls 186 and 188 and outer frame member 24 in order to provide a lighttight environment for the exposed film unit as it is moved between the exposure position and the viewing position. Curtain 190, which is of a fixed length, has one of its terminal ends secured to the underside of member 86 (see FIG. 2). The curtain extends rearwardly (to the right as viewed in FIG. 1) to a point whereat it reverses its direction around roll 71. From roll 71 the curtain extends to the left until it reaches a roll 192 rotatably mounted within drawer 22. The curtain then extends around roll 192 upwardly and over a second roll 194, rotatably mounted on drawer 22 and finally has its other terminal end secured to part of the fixed camera structure at 196.

As the sections of the camera move between the compact, inoperative position shown in FIG. 5 to the extended, operative position shown in FIG. 6 the volume of storage chamber 136 changes from a minimum to a maximum. The structure for accomplishing this change in volume includes a pair of sector gears 200 (only one of which is shown) mounted on opposite sides of pin 156 for rotation about their axis as section 14 moves between the compact and extended positions. Each sector gear 200 is in mesh with a second sector gear 204 mounted on the end of a link 206 pivotally mounted at 208 on a fixed portion of the camera's structure. The other end of each link 206 has a cam surface 210 which is adapted to engage a cam follower 152 located on each side of closure member 26. As can be seen in FIGS. 5 and 6, when section 14 moves to the extended position links 206 rotate in a counterclockwise manner to move cam followers 152 and closure member 26 away from outer frame member 24 thereby increasing the volume of storage chamber 136 until it reaches its maximum volume when the camera is in its extended, operative position as shown in FIG. 6. A second set of cam surfaces 212 (only one of which is shown) located on the lower end of each erecting link 168 are provided for engaging cam followers 150 attached to side walls 140 and 142 of closure member 26 for moving closure member 26 away from outer frame member 24 as erecting links 168 pivot about hinge 214 in a counterclockwise manner. As the sections of the camera move from the extended position to the compact position, cams 210 and 212 will try to move out of engagement with their respective cam followers. However, springs 124, 126 and 154 will urge the cam followers into contact with their respective cams until such time that the thickness of one or more film units located within storage chamber 136 prevents closure member 26 from moving any closer to outer frame member 24. This cooperation between the cams, cam followers and springs, enables the volume of the camera in the compact position to be kept to a minimum, the minimum volume being directly related to the number of film units located within storage chamber 136. In other words, as the camera is moved into the compact position, the volume of storage chamber 136 will automatically be reduced to one which is just sufficient to hold the precise number of film units located within the chamber, thereby keeping the volume of the entire camera to a minimum when the camera is in the compact position.

Cameras of the type so far described, are susceptible to damage during the film loading process because of the close proximity of one or more of the camera's exposure components to the chamber which receives the film container 176. The reason for this is that cameras of the extensible type are usually capable of being loaded while the camera is in the compact, inoperative position. As can be seen in FIG. 5, one of the components of the camera's exposure system, i.e., reflecting surface or mirror 162, is located closely adjacent the area which is adapted to receive the film container 176. If a film container were to be loaded into position within inner support member 20 while the camera is in the compact position shown in FIG. 5, there is a good possibility that the film container will strike mirror 162 and either damage it or cause misalignment of the mirror. Further, because of the compactness of cameras of this type, they are quite often carried in the user's pocket or handbag wherein the camera's loading door latch is subject to accidental actuation; thereby allowing the film loading door to partially open and possibly dislodge the film container and prematurely expose the film units contained therein. Provision is made in the instant camera to ensure that components of the camera's exposure system, which ordinarily lie in a position near the camera's structure which is adapted to support the film container when the camera is in the compact position, are moved to a position away from said structure as the camera is moved into the extended position before the film loading door can be opened. As can be seen in FIGS. 5 and 6, closure member 26 is coupled to inner support member 20 by the magnetic attraction between magnet 102 and a plate 218 mounted on the underside of inner support member 20. Magnet 102 is partially encompassed by a metallic plate 220 for forming a horseshoe type magnet having its poles at 222 and 224. Poles 222 and 224 space the magnet 102 away from plate 218 so as to create a magnetic field therebetween. A lever 128 is provided for breaking the magnetic coupling between magnet 102 and plate 218 to allow closure member 26, outer frame member 24, and drawer 22 to move as a unit to the film loading position shown in FIG. 1. However, as will be noted in FIG. 5, a portion 146 of rear wall 144 is located in a position adjacent lever 128, such that actuation of lever 128 when the camera is in the compact position is prevented by the interference of detent of portion 146. As the camera moves from the compact position of FIG. 5 to the extended position of FIG. 6, closure member 26 is moved away from outer frame member 24 as previously described. As closure member 26 moves away from outer frame member 24, detent 146 is withdrawn from its position in interference with lever 128 to a position which enables actuation of lever 128 to break the magnetic coupling and move closure member 26, frame member 24, and drawer 22 to the position shown in FIG. 1. In this position, i.e., the extended position, the mirror 162 has been moved away from inner support member 20, thereby reducing the possibility of accidentally striking the mirror 162 upon inserting an object through the opening normally occupied by the closure member.

OPERATION

When it is desired to load a film assemblage 174 into the camera of the present invention, the camera as shown in FIG. 5 is erected or extended so that it assumes the configuration shown in FIG. 6. As the camera moves between the compact position of FIG. 5 and the extended position of FIG. 6, cam surfaces 210 and 212 move cam followers 152 and 150 downwardly to space closure member 26 from outer frame member 24 to provide a storage chamber 136. As closure member 26 moves away from outer frame member 24, detent 146 mounted on trailing end wall 144 of of member 26 moves out of its position in interference with lever 128 to a position wherein lever 128 is capable of actuation. Actuation of lever 128 breaks the magnetic coupling between magnet 102 and plate 218 to allow closure member 26, outer frame member 24, and drawer 22 to pivot as a unit about the axis of pivot pin 94 to the open or loading position shown in FIG. 1. Any film units which may be located in storage chamber 136 or in drawer 22 are removed at this time along with the empty film container 176. After inserting a new film assemblage 174 into position within inner support member 20, closure door 26, outer frame member 24, and drawer 22 are moved as a unit to their closed position shown in FIG. 5. The next step is to actuate the camera's shutter mechanism which simultaneously operates the shutter and closes a circuit between a supply of energy, e.g., a battery located within the camera or container, and the camera' s motor for operating rolls 186 and 188 and the film advancing apparatus of the camera to move a dark slide located between the forwardmost film unit 182 and the top or forward wall 184 of the film container 176 into the bite of rollers 186 and 188. Simultaneous with the operation of the film advancing apparatus, sprocket gears (not shown) having their teeth in mesh with apertures 54 in racks 52 are rotated in such a direction as to advance drawer 22 to the left as viewed in FIG. 1. The ratio between the gearing for driving the rolls 186 and 188 and the drawer 22 is such that the rolls 186 and 188 will advance the dark slide to the left at a faster rate than the drawer is moving to the left. Before drawer 22 reaches its furthermost travel to the left the leading end of the dark slide has advanced to a position wherein it is grasped by the resilient spring clip 69 mounted on rear wall 70 of drawer 22. Further leftward movement of the drawer removes the trailing end of the dark slide from between rolls 186 and 188. The construction of spring clip 69 is such as to move the trailing end of the dark slide downwardly to a level below roll 188. At this time means (not shown) are provided for reversing the drive of the sprocket which is engaged with racks 52 to reverse the direction of drawer 22, i.e., move the drawer 22 to the right as viewed in FIG. 1. As drawer 22 moves to the right the dark slide is moved beneath roll 188 where it lies on top of spring clip 69 and the circuit to the camera's motor is opened to complete the operating cycle.

The camera is now ready for exposure of the forwardmost film unit 182 located within film container 176. Actuation of the shutter 's release will simultaneously actuate the shutter to expose the forwardmost film unit and energize the drives to the film advancing means, rolls 186 and 188, and the sprocket drive for drawer 22. Again, drawer 22 reciprocates in the same manner as previously described. Note; at the time drawer 22 starts its movement to the left the dark slide is still located on spring clip 69 within drawer 22. Suitable means, e.g., spring 77, are provided for removing the dark slide from the bite of spring clip 69 as the drawer 22 moves to the left thereby preventing the dark slide from moving with the drawer to the left. The exposed film unit passes between the rolls 186 and 188 which distribute a processing liquid between elements of the film unit for initiating development thereof. Just prior to the drawer reaching its limit of travel to the left, the leading edge of the film unit catches up with and enters the bite of spring clip 69. Spring clip 69 grips the film unit's leading edge until the film unit's trailing edge has passed from between the rolls 186 and 188 and then orients the film unit such that it can be moved in a first direction beneath roll 188 with its visible image facing upwardly, as viewed in FIG. 1. During this time the bottom wall 70 of drawer 22 and spring clip 69 have passed from beneath the dark slide as drawer 22 moved in a second direction, i.e., to the left as viewed in FIG. 1, thereby enabling the dark slide to fall into the storage chamber 136. When drawer 22 reaches the extent of its leftward travel the sprocket drive to racks 52 are again reversed to move the drawer 22 to the right. As with the dark slide, the exposed film unit moves beneath roll 188 as the drawer 22 returns to its original position, i.e., with the leading end wall 64 of drawer 22 located closely adjacent the rolls 186 and 188. At this time the exposed film unit is located in what is termed a viewing position and should the user of the camera desire to view the processed film unit he may now actuate lever 128 to move closure member 26, outer frame member 24, and drawer 22 as a unit to the position shown in FIG. 1. Since the film unit at this time is now located and maintained within drawer 22 by spring clip 69, the user may simply view the film unit in place or remove the film unit, examine it and return it to its position within drawer 22. After viewing the exposed film unit, closure member 26 is then moved together with outer frame member 24 and drawer 22 to the closed position and the next succeeding film unit 182 within film container 176 may be exposed. As the succeeding film units are sequentially exposed and moved in a second direction from their exposure position to the left into the drawer 22 and then to a viewing position wherein the film unit is located within the drawer 22, and behind the film container, the preceding film unit has automatically been moved into the storage chamber 136. Stop members 135 and 137 located near one end of the storage chamber prevent the film units located within the storage chamber 136 from being moved to the left due to the frictional engagement between the uppermost film unit located within the storage chamber and the curtain 190 as the drawer 22 moves to the left. Further, a flexible, opaque sheet 89 is mounted between closure member 26 and member 86 to prevent the admission of actinic light into the storage chamber 136. If at any time between exposures the user of the camera desires to view one of the film units located in the viewing position or within the storage chamber 136 he merely has to actuate lever 128 to move closure member 26, outer frame member 24 and drawer 22 to the position shown in FIG. 1. The user may then remove the film unit from either the viewing position or the storage chamber, view it and return it to its original position. If, after taking a number of exposures less than the number of film units originally contained within film container 176, the user decides to move the sections of the camera into the compact, inoperative position, storage chamber 136 will reduce its volume to one which is just sufficient to contain the number of film units located therein as previously explained, thereby keeping the overall volume of the camera to a minimum.

From the foregoing it can be seen that there has been disclosed a novel and unobvious cooperation of structure for enabling an exposed film unit or photosensitive element to be moved from its exposure position to a viewing position prior to being moved into a storage chamber. The exposed photosensitive element is oriented and supported such that its visible image is facing the viewer thereby enabling viewing of the image without handling of the photosensitive element.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus of the type wherein a plurality of individual photosensitive elements are adapted to be located in stacked relation in position to be individually exposed, processed and viewed between exposures, the improvement comprising:

means for supporting the stack of photosensitive elements in position for exposure;

means for moving an exposed photosensitive element subsequent to exposure from an exposure position at one end of the stack to a viewing position located behind the opposite end of the stack while maintaining the exposed photosensitive element in a generally planar configuration; and means for providing ingress to said viewing position after each exposure to permit in place viewing of the image recorded on the exposed photosensitive element without handling the same and to permit removal of the exposed photosensitive element.

2. The improvement according to claim 1 further including means defining a storage chamber for receiving an exposed photosensitive element located in said viewing position as said means for moving moves the next exposed photosensitive element from said exposure position to said viewing position.

3. In photographic apparatus of the type wherein a plurality of photosensitive elements are adapted to be exposed, processed and individually viewed between exposures, the improvement comprising:

means for supporting a photosensitive element in position for exposure;

means for transporting an exposed photosensitive element from said exposure position to a viewing position;

means for retaining the exposed photosensitive element in place while located in said viewing position;

means defining a storage chamber for receiving exposed photosensitive elements;

means for providing ingress to said viewing position after each exposure to allow viewing of the exposed photosensitive element without handling the same and to permit removal of a selected photosensitive element from either said viewing position or said storage chamber; and said means for transporting being adapted to allow movement of an exposed photosensitive element from said viewing position to said storage chamber and orient the exposed photosensitive element in a manner in which it is adapted to be viewed in place in said viewing position prior to being moved to said storage chamber.

4. The improvement according to claim 3 wherein said storage chamber is adapted to again receive an exposed photosensitive element after it has been removed from said storage chamber for viewing.

5. The improvement according to claim 4 wherein said means for providing ingress comprise a portion of said storage chamber.

6. The improvement according to claim 5 further including means for maintaining said exposed photosensitive element in a lighttight environment during movement between the exposure and viewing positions.

7. In photographic apparatus of the type wherein a plurality of photosensitive elements are adapted to be exposed, processed and individually viewed between exposures, the improvement comprising:

means for supporting a photosensitive element in position for exposure;

means for transporting an exposed photosensitive element from said exposure position to a viewing position;

means for retaining the exposed photosensitive element in place while located in said viewing position;

means for providing ingress to said viewing position after each exposure to allow viewing of the exposed photosensitive element without handling the same;

means defining a storage chamber for receiving exposed photosensitive elements; and means for moving said means for transporting in first and second directions, movement of said means for transporting in said first direction moves an exposed photosensitive element into said viewing position and movement of said means for transporting in said second direction allows movement of the exposed photosensitive element into said storage chamber.

8. The improvement according to claim 7 wherein said means for transporting allows movement of an exposed photosensitive element from said viewing position to said storage chamber as a succeeding exposed photosensitive element is moved between said exposure position and said viewing position.

9. The improvement according to claim 8 further including means for maintaining said exposed photosensitive element in a lighttight environment during movement between the exposure and viewing positions.

* * * * *